H. KRANTZ.
METER PANEL.
APPLICATION FILED JULY 28, 1909.

961,142.

Patented June 14, 1910.

2 SHEETS—SHEET 1.

Witnesses
C. A. Jarvis
Benjamin Olsen-Krag

Inventor:
Hubert Krantz
by Chrystie and Wright
his Attorneys

H. KRANTZ.
METER PANEL.
APPLICATION FILED JULY 28, 1909.
961,142.
Patented June 14, 1910.
2 SHEETS—SHEET 2.
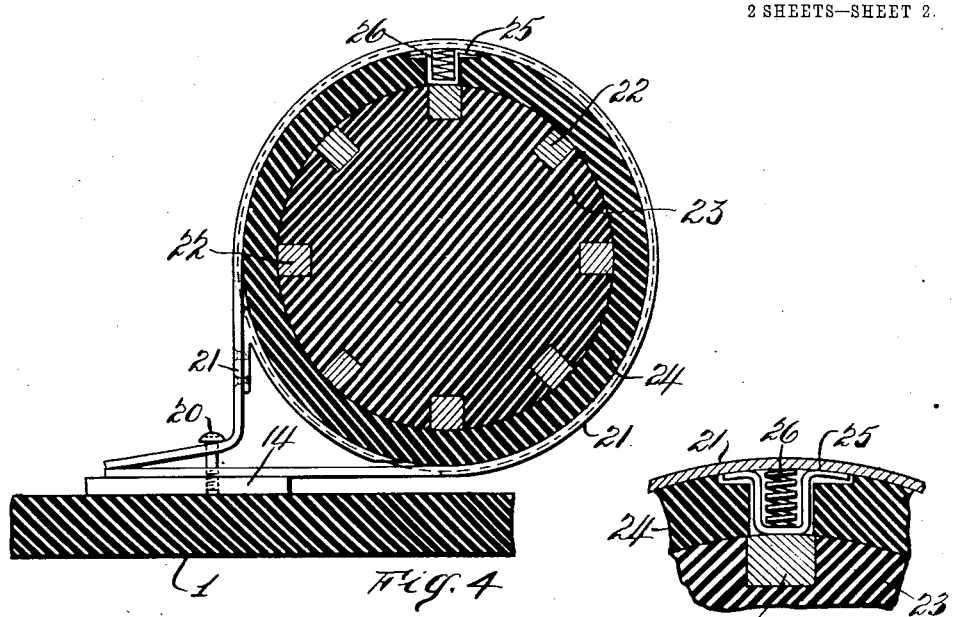
Fig. 4.
Fig. 6.
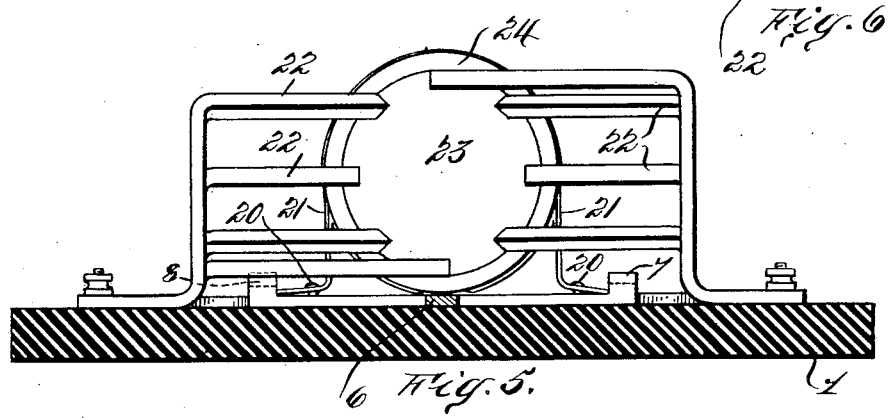
Fig. 5.
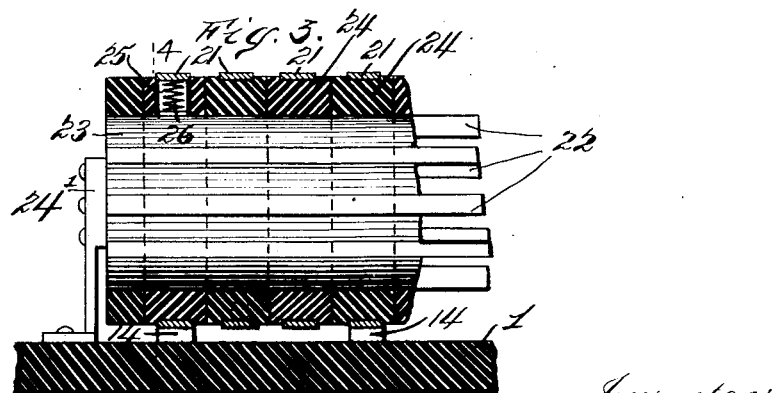
Fig. 3.
Witnesses
E. A. James
Benjamin O. Krantz
Inventor:
Hubert Krantz
by Chrystie and Wright
his attorneys.

UNITED STATES PATENT OFFICE.

HUBERT KRANTZ, OF NEW YORK, N. Y., ASSIGNOR TO H. KRANTZ MANUFACTURING COMPANY, OF NEW YORK, N. Y., A CORPORATION OF NEW YORK.

METER-PANEL.

961,142.  Specification of Letters Patent.  Patented June 14, 1910.

Application filed July 28, 1909. Serial No. 510,000.

*To all whom it may concern:*

Be it known that I, HUBERT KRANTZ, a citizen of the United States, residing at Brooklyn, county of Kings, city and State of New York, have invented certain new and useful Improvements in Meter-Panels, of which the following is a clear, full, and exact description.

This invention relates to meter panels or panel boards.

The object of the invention is to provide a simple, electrically and mechanically efficient article of manufacture of this class in which one or more different branch circuits may be readily brought into circuit with any desired meter.

In carrying out my invention I provide a panel board having a base, generally of insulating material such as marble or slate on which is mounted the usual main supply terminals, switch, bus and cross bars and fuses. The meter bars are grouped preferably concentrically and preferably laid in slots in a cylinder of insulating material. The meter bars are preferably located at right angles to and cross the cross bars to which they are to be connected, their ends however are preferably turned to lie parallel with the cross bars for uniformity of connection.

There is provided a movable selective contact device, preferably a spring pressed U shaped piece of phosphor bronze. This is preferably carried in an insulated ring fitting around the grouped meter bars and rotatable thereon so that the contact device may be brought into contact with any one of the grouped meter bars that it is desired to connect with a given branch circuit. The contact device is connected by suitable connections in all its possible positions with a cross bar of its branch circuit. These connections preferably take the form of a brake strap conductor encircling the ring contacting with the contact device and secured adjustably to the cross bar. By "secured adjustably" I mean so permanently and tightly secured by a screw or equivalent means that the ring cannot be turned, or secured loosely and temporarily so that the ring and contact device may be shifted at will.

The scope of the invention will be particularly set forth in the claims.

Figure 1:
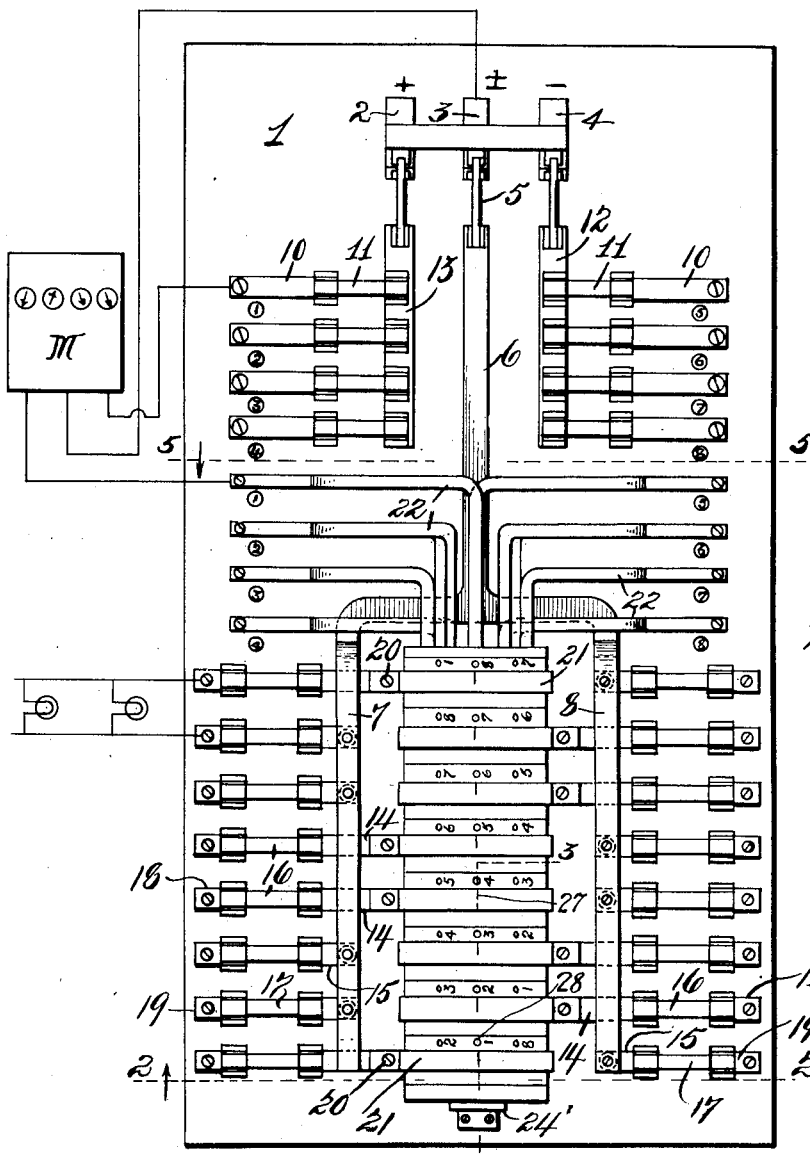
Figure 2:
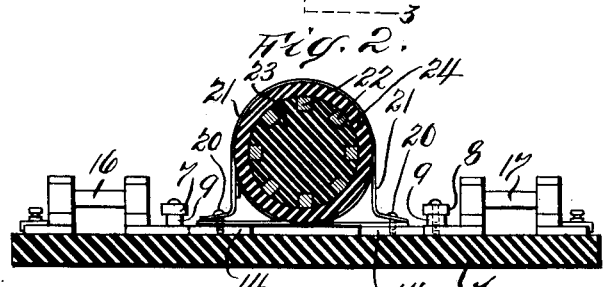

In the accompanying drawings, Figure 1 is a front elevation of a meter panel of this invention. Fig. 2 is a cross section on line 2—2, Fig. 1. Fig. 3 is a longitudinal section of part of the meter bars and contact carrying rings taken on line 3—3 Fig. 1, some of the parts being in side elevation. Fig. 4 is a cross section on line 4—4 Fig. 3. Fig. 5 is a cross section on line 5—5 Fig. 1, and Fig. 6 is an enlarged sectional detail of the movable selective contact device.

As shown in the drawings: 1 is the base or back plate of the panel board of insulating material; 2, 3 and 4 are the supply circuit terminals; 5 is the main switch; 6 is the neutral bus bar bifurcated and its bifurcations 7 and 8 crossing the cross bars to some of which they are connected by bushings 9. Cross bars for meter connections are indicated at 10 where they are connected through fuses 11 with the bus bars 12 or 13, as the case may be, connected in turn to the terminals 4 and 2 respectively.

Cross bars 14 are located along each side of the board 1 for connection with fuses 16 and branch circuit connections 18, and at their other end with the meter bars as hereinafter described. Cross bars 15 attached to the neutral bus bars by bushings 9 are connected by fuses 17 with branch circuit connections 19.

The cross bars 14 for meter connection extend well out toward the middle of the board and near their end they are engaged by a screw 20 passing through both ends of a clamping strap 21 to be hereinafter described.

The meter bars 22 are mounted and set into a cylinder 23 of insulating material, which cylinder may be supported at one end by a bracket 24' secured to the base 1. The bars 22 have one surface flush with the cylindrical surface and bars and cylinder extend past all branch circuit cross bars. The meter bars 22 where they emerge from the end of the cylinder 23 are turned toward one side or the other at right angles as will be readily seen in Fig. 5, to bring their terminals along the side of the board for ready connection with the meters. One such meter is shown at M.

In line with each cross bar for meter and branch circuit connection I provide a rotatable ring 24 turning on the cylinder 23 and within the brake strap 21. The ring carries a contact device 25 of a piece of U-shaped metal which may be reinforced by a spring 26; when the bolt 20 of the brake strap 21 is loose the ring may be rotated at will to cause the contact device 25 to come into engagement with any one of the meter bars in the surface of the cylinder 23, but when the bolt 20 is tightened the movement of the ring will be prevented and the contact device additionally held down by the tightened strap. This ring and contact 25 constitutes a movable selective contact device and the strap a connection therefor to the bus bars.

To aid in properly registering the contact 25 with a meter bar the ring may carry an index reading 1—2—3—4—5—6—7—8— in this instance, and the strap have a mark 27 thereon to register with an index number on the ring and thus provide an indicator means for determining the position of the movable selective contact device. To aid in rotating the ring holes 28 may be provided for engagement with a nail, spanner or the like.

It is believed the operation and use of the device will be apparent to any one skilled in the art; hence it will be sufficient to say that on turning the lowermost ring to register 1 one side of the lowest left hand branch circuit will be connected with the meter M through meter bar 1 while the other side of the branch circuit will be connected through neutral bus bar 7 with neutral terminal 3; the meter is on the other hand connected with plus terminal 2.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. In combination with a meter, a panel board, comprising a base, bus bars and cross bars, branch circuits and supply circuits, and grouped meter bars in proximity to one cross bar of a number of branch circuits, a selective contact device rotatively but permanently secured to the panel board, and connections therefor between said cross bar and the selective contact device, whereby the contact device may at will be brought into contact with the meter bar of the grouped meter bars.

2. In combination with a meter, a panel board comprising a base, bus bars and cross bars, branch circuits and a supply circuit, and grouped meter bars in proximity to one cross bar of a number of branch circuits, a movable selective contact device and connections therefor between said cross bar and the movable selective contact device, and means for at will bringing such contact device into contact with a meter bar of the grouped meter bars, and clamping mechanism adapted to hold the selective device in contact position.

3. In combination with a meter, a panel board comprising a base, bus bars and cross bars, branch circuits and a supply circuit, and grouped meter bars in proximity to one cross bar of a number of branch circuits, a movable selective contact device and connections therefor between said cross bar and the movable selective contact device, and means for at will bringing such contact device into contact with a meter bar of the grouped meter bars, and indicator means for determining the relative location of the selective device with the grouped meter bars.

4. In combination with a meter, a panel board comprising a base, bus bars and cross bars, branch circuits and a supply circuit, and grouped meter bars in proximity to one cross bar of a number of branch circuits, a movable selective contact device and connections therefor between said cross bar and the movable selective contact device, and means for at will bringing such contact device into contact with a meter bar of the grouped meter bars, and clamping mechanism adapted to hold the selective device in contact position, and indicator means for determining the relative location of the selective device with the grouped meter bars.

5. In combination with a meter, a panel board comprising a base, bus bars and cross bars, branch circuits and a supply circuit, and grouped meter bars in proximity to one cross bar of a number of branch circuits, a movable selective contact device and connections therefor between said cross bar and the movable selective contact device, and means for at will bringing such contact device into contact with a meter bar of the grouped meter bars, said grouped meter bars being concentrically placed, said movable selective contact device being movable concentrically to the grouped bars.

6. In combination with a meter, a panel board comprising a base, bus bars and cross bars, branch circuits and a supply circuit, and grouped meter bars in proximity to one cross bar of a number of branch circuits, a movable selective contact device and connections therefor between said cross bar and the movable selective contact device, and means for at will bringing such contact device into contact with a meter bar of the grouped meter bars, and clamping mechanism adapted to hold the selective device in contact position, said grouped meter bars being concentrically placed, said movable selective contact device being movable concentrically to the grouped bars.

7. In combination with a meter, a panel board comprising a base, bus bars and cross bars, branch circuits and a supply circuit, and grouped meter bars in proximity to one cross bar of a number of branch circuits, a movable selective contact device and connections therefor between said cross bar and the movable selective contact device, and means for at will bringing such contact device into contact with a meter bar of the grouped meter bars, and indicator means for determining the relative location of the selective device with the grouped meter bars, said grouped meter bars being concentrically placed, said movable selective contact device being movable concentrically to the grouped bars.

8. In combination with a meter, a panel board comprising a base, bus bars and cross bars, branch circuits and a supply circuit, and grouped meter bars in proximity to one cross bar of a number of branch circuits, a movable selective contact device and connections therefor between said cross bar and the movable selective contact device, and means for at will bringing such contact device into contact with a meter bar of the grouped meter bars, and clamping mechanism adapted to hold the selective device in contact position, and indicator means for determining the relative location of the selective device with the grouped meter bars, said grouped meter bars being concentrically placed, said movable selective contact device being movable concentrically to the grouped bars.

9. In combination with a meter, a panel board comprising a base, bus bars and cross bars, branch circuits and a supply circuit, and grouped meter bars in proximity to one cross bar of a number of branch circuits, a movable selective contact device and connections therefor between said cross bar and the movable selective contact device, and means for at will bringing such contact device into contact with a meter bar of the grouped meter bars, said grouped meter bars being concentrically placed, said movable selective contact device being movable concentrically to the grouped bars, a ring carrying the selective contact device and insulated from the meter bars, a clamping strap for the ring contacting with said device, the strap adjustably secured to a cross bar whereby the ring may be prevented from rotating.

10. In combination with a meter, a panel board comprising a base, bus bars and cross bars, branch circuits and a supply circuit, and grouped meter bars in proximity to one cross bar of a number of branch circuits, a movable selective contact device and connections therefor between said cross bar and the movable selective contact device, and means for at will bringing such contact device into contact with a meter bar of the grouped meter bars, said grouped meter bars being concentrically placed, said movable selective contact device being movable concentrically to the grouped bars, a ring carrying the selective contact device and insulated from the meter bars, a clamping strap for the ring contacting with said device, the strap adjustably secured to a cross bar whereby the ring may be prevented from rotating, and an indicator means for determining the relative position of the selective device with the grouped meter bars.

11. In combination with a meter, a panel board, comprising a base, bus bars and cross bars, branch circuits and supply circuits, and grouped meter bars in proximity to one cross bar of a number of branch circuits, a selective contact device rotatively but permanently secured to the panel board, and connections therefor between said cross bar and the selective contact device, whereby the contact device may at will be brought into contact with the meter bar of the grouped meter bars, said grouped meter bars being at right angles to and crossing all cross bars for meter connection.

12. In combination with a meter, a panel board comprising a base, bus bars and cross bars, branch circuits and a supply circuit, and grouped meter bars, in proximity to one cross bar of a number of branch circuits, a movable selective contact device and connections therefor between said cross bar and the movable selective contact device, and means for at will bringing such contact device into contact with a meter bar of the grouped meter bars, and clamping mechanism adapted to hold the selective device in contact position, said grouped meter bars being at right angles to and crossing all cross bars for meter connection.

13. In combination with a meter, a panel board, comprising a base, bus bars and cross bars, branch circuits and supply circuits, and grouped meter bars in proximity to one cross bar of a number of branch circuits, a selective contact device rotatively but permanently secured to the panel board, and connections therefor between said cross bar and the selective contact device, whereby the contact device may at will be brought into contact with the meter bar of the grouped meter bars, and indicator means for determining the relative location of the selective device with the grouped meter bars, said grouped meter bars being at right angles to and crossing all cross bars for meter connection.

14. In combination with a meter, a panel board comprising a base, bus bars and cross bars, branch circuits and a supply circuit, and grouped meter bars, in proximity to one cross bar of a number of branch circuits, a movable selective contact device and connections therefor between said cross bar and the movable selective contact device, and means for at will bringing such contact device into contact with a meter bar of the grouped meter bars, said grouped meter bars being concentrically placed, said movable selective contact device being movable concentrically to the grouped bars, said grouped meter bars being at right angles to and crossing all cross bars for meter connection.

15. In combination with a meter, a panel board, comprising a base, bus bars and cross bars, branch circuits and supply circuits, and grouped meter bars in proximity to one cross bar of a number of branch circuits, a selective contact device rotatively but permanently secured to the panel board, and connections therefor between said cross bar and the selective contact device, whereby the contact device may at will be brought into contact with the meter bar of the grouped meter bars, said grouped meter bars being at right angles to and crossing all cross bars for meter connection, the end of each meter bar being turned to lie at right angles to the length of the board and parallel to the cross bars.

16. In combination with a meter, a panel board comprising a base, bus bars and cross bars, branch circuits and a supply circuit, and grouped meter bars, in proximity to one cross bar of a number of branch circuits, a movable selective contact device and connections therefor between said cross bar and the movable selective contact device, and means for at will bringing such contact device into contact with a meter bar of the grouped meter bars, and clamping mechanism adapted to hold the selective device in contact position, said grouped meter bars being at right angles to and crossing all cross bars for meter connection, the end of each meter bar being turned to lie at right angles to the length of the board and parallel to the cross bars.

Signed at Brooklyn, New York this 21st day of July 1909.

HUBERT KRANTZ.

Witnesses:
S. L. WHITCH,
E. PINKERTON.